United States Patent [19]

Nakaya

[11] B 3,927,374

[45] Dec. 16, 1975

[54] SAMPLING OSCILLOSCOPE CIRCUIT

[75] Inventor: Naohisa Nakaya, Komae, Japan

[73] Assignee: Iwasaki Tsushinki Kabushiki Kaisha, Japan

[22] Filed: Nov. 27, 1972

[21] Appl. No.: 309,681

[44] Published under the Trial Voluntary Protest Program on January 28, 1975 as document no. B 309,681.

[30] Foreign Application Priority Data

Nov. 29, 1971 Japan .............................. 48-95236

[52] U.S. Cl. ................. 328/151; 307/238; 307/246

[51] Int. Cl.[2] .................... G11C 11/24; H03K 5/00; Ho3K 17/60

[58] Field of Search ............ 307/246, 238; 328/151

[56] References Cited

UNITED STATES PATENTS

| | | | |
|---|---|---|---|
| 3,474,259 | 10/1969 | Rogers | 307/246 X |
| 3,564,289 | 2/1971 | Smith-Saville | 307/246 |
| 3,586,880 | 6/1971 | Fitzwater | 307/246 X |
| 3,594,589 | 7/1971 | Hall | 307/246 X |
| 3,600,693 | 8/1971 | Van Den Berg | 307/246 |
| 3,610,958 | 10/1971 | Reiling | 307/246 X |
| 3,659,117 | 4/1972 | Caveney et al. | 307/246 X |
| 3,675,135 | 7/1972 | Weller | 307/246 |
| 3,701,909 | 10/1972 | Holmes et al. | 307/246 |
| 3,702,944 | 11/1972 | Shigaki | 307/246 |
| 3,731,117 | 5/1973 | Everest et al. | 307/246 X |

*Primary Examiner*—John Zazworsky
*Assistant Examiner*—William D. Larkins
*Attorney, Agent, or Firm*—Robert E. Burns; Emmanuel J. Lobato; Bruce L. Adams

[57] ABSTRACT

A sampling circuit for a sampling oscilloscope comprises a sampling gate circuit receptive of an input signal to be sampled. A sampling pulse generator circuit develops narrow sampling pulses which are applied to enable the sampling gate circuit. Input signal samples from the sampling gate are applied to an amplifier which in turn applies input signal samples to another gate circuit. The other gate circuit receives gate signals developed in synchronism with the sampling pulses by a gate signal generator to enable the other gate circuit. When the other gate circuit is enabled an input signal sample is applied to a memory circuit which stores the input signal sample therein. A feed circuit and an output amplifier receive the output of the memory circuit. The feed circuit develops a first signal proportional to the input signal sample stored in the memory and applies the first signal to the other gate circuit when the other gate circuit is enabled to store a subsequent input signal sample in the memory circuit. The feed circuit develops a second signal proportional to the input signal sample stored in the memory by the same amount as the first signal and subtracts the second signal from the input signal to the output amplifier. The first and second signals developed by the feed circuit reduce amplitude fluctuations in the output of the sampling circuit.

6 Claims, 8 Drawing Figures

SAMPLING OSCILLOSCOPE CIRCUIT

This invention relates to a sampling oscilloscope circuit.

Conventional sampling oscilloscope circuits have such disadvantages as difficulty in adjustment, unstable operations and fluctuation of output levels.

An object of this invention is to provide a sampling oscilloscope circuit obtainable of simple adjustments, stable operations and reduction of noise.

The principle, construction and operations of this invention will be clearly understood from the following detailed discription taken in conjunction with the accompanying drawings: in which.

To clearly distinguish the present invention from conventional arts, an example of conventional sampling oscilloscope circuits will first be described.

Figure 1:
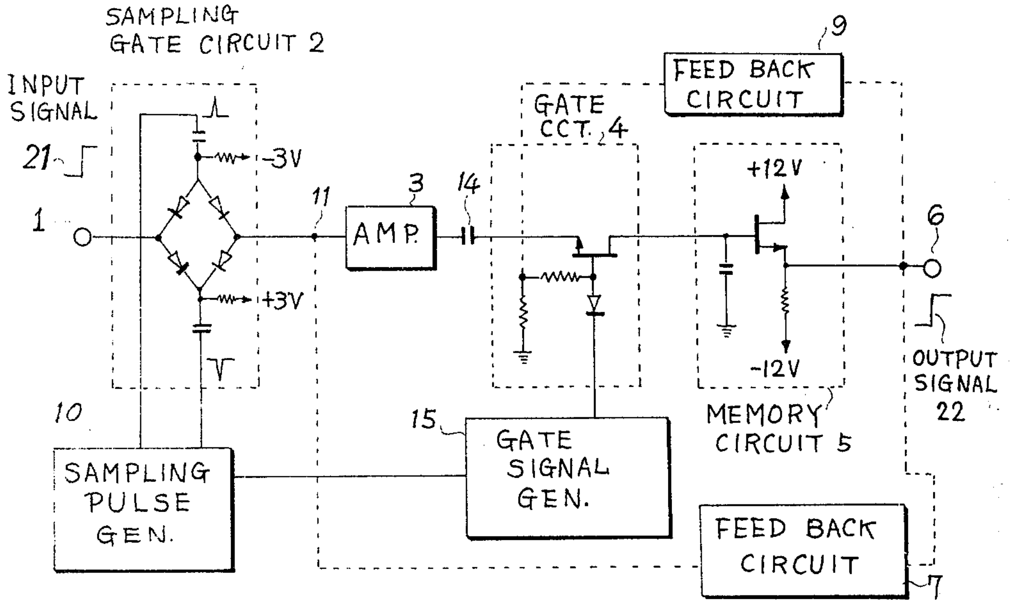
FIG. 1 is a circuit diagram illustrating an example of a conventional sampling oscilloscope circuit.

FIG. 1 is a circuit diagram showing the construction of a vertical signal circuit employed in a conventional sampling oscilloscope, which includes a sampling gate circuit 2 for sampling an input signal 21, an amplifier 3, a gate circuit 4, a memory circuit 5, pulse generators 10 and 15 and so on. FIG. 2 shows waveforms for explaining the operations of the circuit of FIG. 1. With reference to FIGS. 1 and 2, the conventional sampling oscilloscope will be described. A reference numeral 1 indicates an input terminal, to which an input signal 21 (which is illustrated as a step-function but may be any arbitrary waveform) is applied. Input signal 21 is then applied to a sampling gate circuit 2 (a first gate circuit). The sampling gate circuit 2 is opened by pulse of small width and of short rise time from the sampling pulse generator 10, thereby sampling an instantaneous level of the input signal 21. It is desirable that the circuit connected to the output of the sampling gate circuit 2, that is, to a connection point 11 have the characteristics of a perfect memory circuit or at least that its time constant is sufficiently smaller than the repetition period of the sampling pulses. In general, however, it is difficult to form a perfect memory circuit in terms of impedance, so that the circuit in the illustrated example is constructed to have a time constant sufficiently smaller than the repetition sampling period. Consequently, pulses are always produced, which have a level obtained by dividing the instant level of the input signal at terminal 1 by the impedance of the gate circuit 2 and that of the connection point 11, and each of which has a pulse width wider than each sampling pulse. The ratio of the instantaneous value of the input signal 21 to the pulse or input signal sample voltage at the connection point 11 is referred to as the sampling efficiency. Namely, the sampling efficiency is 100 percent when the input and the output are equal to each other, and it is 50 percent when the output pulse voltage is one-half the sampled instantaneous value of the input signal. A description will be given of the case where the sampling efficiency is 100 percent.

The input signal sample pulse output sampled by the sampling gate circuit 2 is appropriately amplified at the amplifier 3 and then applied to a second gate circuit 4 through a coupling capacitor 14. The second gate circuit 4 is opened or enabled by second gate derived from the second gate signal generator 15 which generates pulse synchronized with the sampling pulses. During the opened time of the gate 4, the input signal sample from the amplifier 3 is fed to the memory circuit 5 to store therein a voltage proportional to the input signal sample voltage until the next sampling instant. The memory circuit 5 comprises a capacitor and a field effect transistor and is a high impedance circuit when the gate circuit 4 is closed. An output signal 22 therefrom is applied to an amplifier, an attenuator or a mode switching circuit at the subsequent stage not shown so as to display on the screen of a sampling oscilloscope.

In the circuit of FIG. 1, a pulse havng a voltage proportional to the instantaneous value of the input signal 21 can readily be obtained by appropriate selection of the value of the time constant exhibited by the impedance at the connection point 11. However, in view of the impedance of the second gate circuit 4 or the allowable power of the amplifier 3, it cannot be stated positively that even if pulses of the same voltage are applied to the memory circuit 5, the outputs therefrom will be equal. This is the so-called dot response. The following will describe the dot response.

Figure 2A:
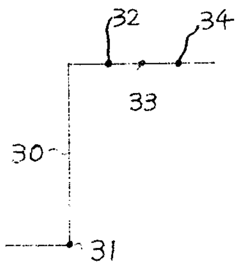
FIGS. 2A, 2B and 2C are waveform diagrams explanatory of the operation of the circuit shown in FIG. 1.
Figure 2B:
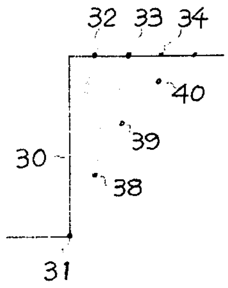
Figure 2C:
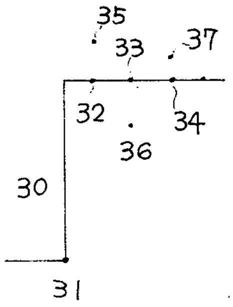

It is now assumed that the sampling gate circuit 2 generates a pulse propertional to the instantaneous value of the input signal 21 at any time, that the sampling efficiency is 100 percent, and that the gain of the amplifier 3 is one. If the path impedance of the gate circuit under the conductive condition in the opened state of the second gate circuit 4 is zero, and if the memory circuit 5 also stores the same voltage as that of the generated pulse, when an input signal such as indicated by a reference numeral 30 in FIG. 2A is applied, the output of the memory circuit 5 will be exactly the same waveform as the input signal as indicated by references 31, 32, 33 and 34. However, if the second gate circuit 4 has a certain resistance component, and if the memory 5 also does not store the same voltage as a input pulse voltage, in the case where the level point 32 is sampled after the zero level 31 of the signal, when such an input signal as indicated by a reference 30 is applied a pulse of the same voltage as the instantaneous value of the input signal is applied to the second gate circuit 4. But, the output of the memory circuit 5 cannot reach the input pulse and settles a lower voltage level 38 as shown in FIG. 2B. This is the memory efficiency. When the next sampling is achieved under such condition and the same level 33 as the level 32 is sampled, a pulse of the same voltage as that in the case of the level 32 is applied to the input of the second gate circuit 4. However, if the input pulse voltage and the output of the memory circuit 5 at this time are equal to each other, no change is caused in the output of the memory circuit 5. If the memory efficiency is lower than 100 percent, the output level of the memory circuit 5 rises by the memory efficiency the difference between the input pulse voltage and the memory level. Namely, even if no change is caused in the instantaneous value of the input signal, the output of the memory circuit 5 rises. Namely, the output waveform becomes distorted.

In order that a waveform similar to that of the input signal can be obtained at the output of the memory circuit 5, the voltage level stored by the first sampling instant is applied to the second gate circuit 4 at the time of the next sampling instant or the value corresponding to a superposed voltage of the DC level of the input side of the second gate circuit 4 and the pulse voltage is made equal to the memory level. In the former case, the output of the memory circuit 5 is adjusted to an appropriate value and, in the next sampling operation, the adjusted output is applied, for example, to a delay circuit or an integrator and fed back to the sampling gate circuit 2 (the connection point 11) through a first feedback circuit 7. Namely, if the memory efficiency of the memory circuit 5 is taken as $a$ percent, the amount of the signal fed back to the sampling gate circuit 2 is determined at a value of $(100 - a)$ percent. However, if the feedback amount is too large, the resulting output waveform fluctuates or oscillates as indicated by references 35, 36 and 37 in FIG. 2C. In the latter case, if the memory efficiency is also taken as $a$ percent, the output (the feedback signal) of the memory circuit 5 whose polarity is reversed at the voltage of $(100 - a)$ percent is applied by the second feedback circuit 9 at the time of the next sampling operation, thus providing the same results.

Further, there are some occasions where observation with the sampling oscilloscope is achieved with poor efficiency but in a small noise level. This is achieved by a noise reducing circuit of the sampling oscilloscope and referred to as smoothing.

The noise reduction has heretofore been achieved by decreasing the gain or the band width of the amplifier 3. This is possible in a case where the output of the memory circuit 5, having the same level as that of the instantaneous value of the input signal 21, and the output of the memory circuit 5, having the same polarity and level as those of the input pulse to the second gate circuit 4 from the amplifier 3, are simultaneously applied to the input side of the second gate circuit 4 through the first and second feedback circuits 7 and 9 respectively at the time of the next sampling instant in spite of the sampling efficiency of the sampling gate circuit 4 or the memory efficiency of the memory circuit 5. If either one of the two feedback outputs is not appropriate, the final output level of the memory circuit 5 varies when smoothing is effected by controlling the gain or the bandwith of the amplifier 3.

Accordingly, adjustment therefor is difficult, and the time constants of other circuits or the power, the linearity and so on of other circuits present problems.

In accordance with this invention, the aforesaid defects experienced in the prior art can be effectively eliminated.

Figure 3:
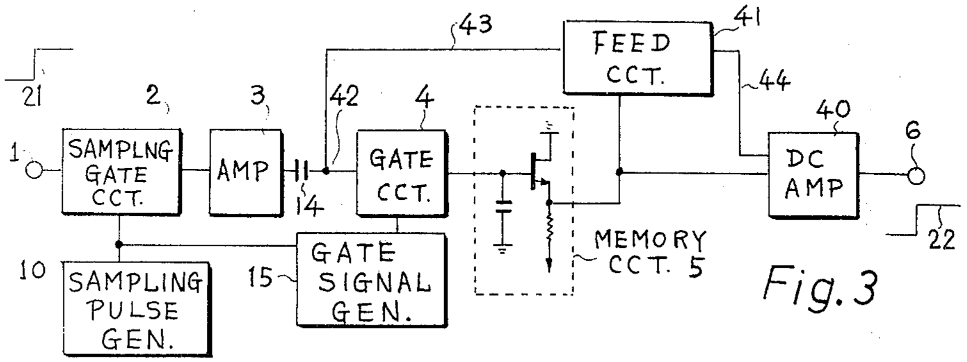
FIGS. 3, 4 and 5 are block diagrams each illustrating an example of this invention.

FIG. 3 is a diagram showing an example of this invention, in which a DC amplifier 40 and a feed circuit 41 are added to the basic circuit of FIG. 1. An appropriate DC amplifier may also be connected between a connection point 42 and the second gate circuit 4. The principle of the circuit will be described in connection with a case where the efficiency of the memory circuit 5 is 100 percent and the feedback circuits 7 and 9 employed in the example of FIG. 1 are not necessary.

When the feed amount of the feed circuit 41 in FIG. 3 is zero, a signal 22 similar to an input signal can be derived is developed at an output terminal 6 after being appropriately amplified. Feed paths 43 and 44 include delay circuits, integrating circuits or other memory circuits havng a time delay such that the output of the memory circuit 5 stored therein by the preceding sampling operation can be fed to gate circuit 4 and amplifier 40 at the next sampling instant. Moreover, it is assumed that the feed path 43 feeds therethrough the output of the memory circuit 5 to the gate circuit 4 at a ratio c/n of the instantaneous value of the input pulse signal. At this time, if the input pulse to the second gate circuit 4 from the amplifier 3 is a constant voltage, and if the output $V_{01}$ of the memory circuit 5 in the absence of the feed path 43 is taken as $V_1$, the output $V_{01}$ is given by $$V_{01} = V_1\{1 + c/n + (c/n)^2 + (c/n)^3 \ldots\ldots\} = V_1/1 - c/n \qquad (1)$$

and increases $1/1 - c/n$ times.

However, the feed path 43 includes the memory circuit 5, that is, an integrating circuit (a noise filter) If noise is much smaller than the input pulse, its value will be equal to that in the case of zero feedback and is smaller than the final voltage. However, since the output of the memory circuit 5 is fed through the feed path 43, the final or steady state voltage is greater than in the case zero feedback.

A signal opposite in polarity to the output of the memory circuit 5 is fed to the amplifier 40 for compensating for the above mention voltage increased. In this case, the signal can also be reversed in polarity by the feed circuit 41. However, in a case where the amplifier 40 is a differential amplifier, the signal of the same polarity as the output of the memory circuit 5 can be applied to an input thereof other than the input from the memory circuit 5 as shown in FIG. 3. If, now, the signal is fed by a value $c/m$ through the feed path 44 from the feed circuit 41 and if the gain of the amplifier 40 is taken as a value $G_1$, the output $V_0$ of the amplifier 40 is given by $$V_o = G_1\,(1 - c/m)\,V_{01} \qquad (2)$$

However, if the output of the memory circuit 5 is fed through the feed paths 43 and 44 when the output pulse $V_1$ of the amplifier 3 is a constant, the output $V_O$ is given by $$V_o = G_1\,(1 - c/m)\,V_{01} = G_1\,(1 - c/m)\,(1/1 - c/n)V_1 \qquad (3)$$

It will be seen that even if the feed amounts of the feed paths 43 and 44 vary, the final output voltage $V_O$ may be made constant under the following condition:

$$1/m = 1/n \qquad (4)$$

In this case, the following condition is satisfied by the equations (3) and (4)

$$V_0 = G_1 V_1 \qquad (5)$$

If values $1/m$ and $1/n$ are of the same value, and if increasing or decreasing the feed amounts of the feed paths 43 and 44 is performed at the same ratio a change in the final value of $V_O$ can be made zero. At this time, the absolute value of noise in the memory circuit 5 does not increase and the required gain of the amplifier 40 decreases in proportion to the feed amounts, so that noise also decreases. Further, it is also possible to suppress fluctuations in the DC level as well as in the steady state to zero by adjusting the feed amounts. Accordingly, the optimum adjustment can easily be achieved by adjusting the feed amounts of the feed paths 43 and 44 in a manner to suppress the DC level fluctuation to zero.

Figure 4:
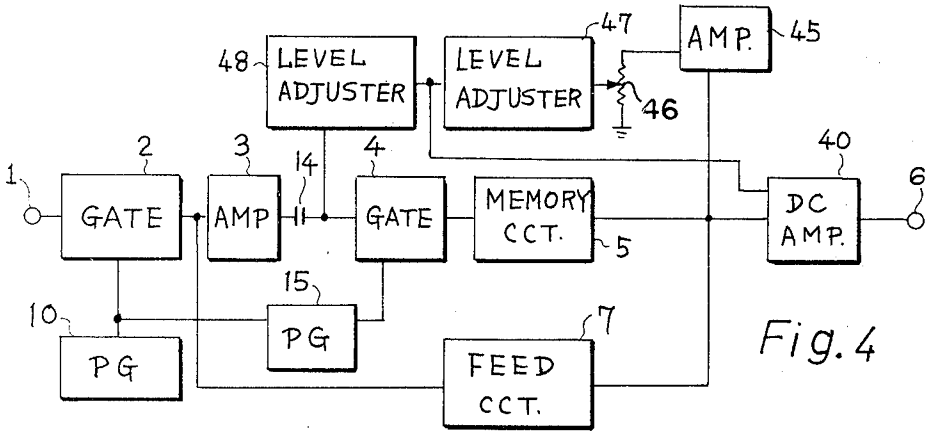

FIG. 4 illustrates another example in which the output of the memory circuit 5 is fed to the sampling gate circuit 2 through the feed circuit 7 to compensate for the efficiency of the memory circuit 5. A reference numeral 45 indicates an amplifier, 46 a feed level adjuster, and 47 and 48 level adjusters such as amplifiers, attenuators or the like. When the feed adjuster 46 is varied, the feed amount is adjusted so that a fluctuation in the DC level or in the steady state value of the signal may be reduced to zero, that is, so that a condition: $1/m = 1/n$ is obtained. The amplifier 45 or the level adjuster 47 determines the final feed amount. Namely, they are used for determining the noise reduction ratio.

Figure 5:
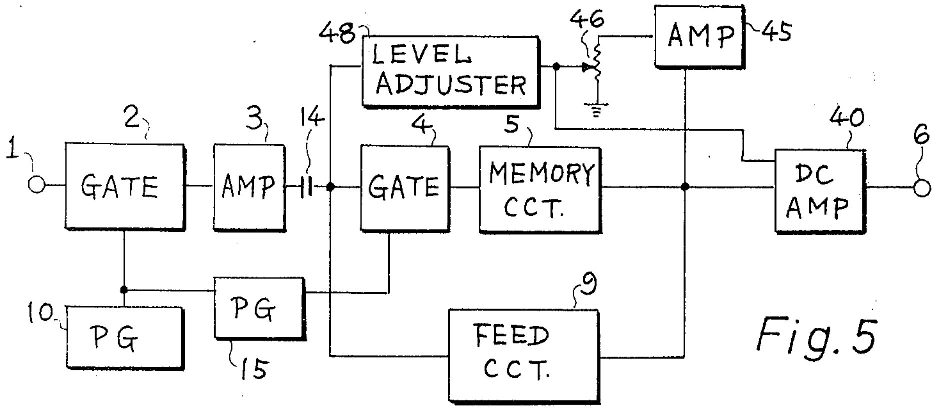

FIG. 5 shows another example of this invention as being applied to a circuit in which a signal opposite in polarity to the output of the memory circuit 5 is fed to the second gate circuit 4 to compensate for the memory efficiency. In a case where a differential DC amplifier is provided before the second gate circuit 4, it is also possible that a signal of the same polarity as the input pulse signal thereof be fed to the inverting input terminal thereof.

Figure 6:
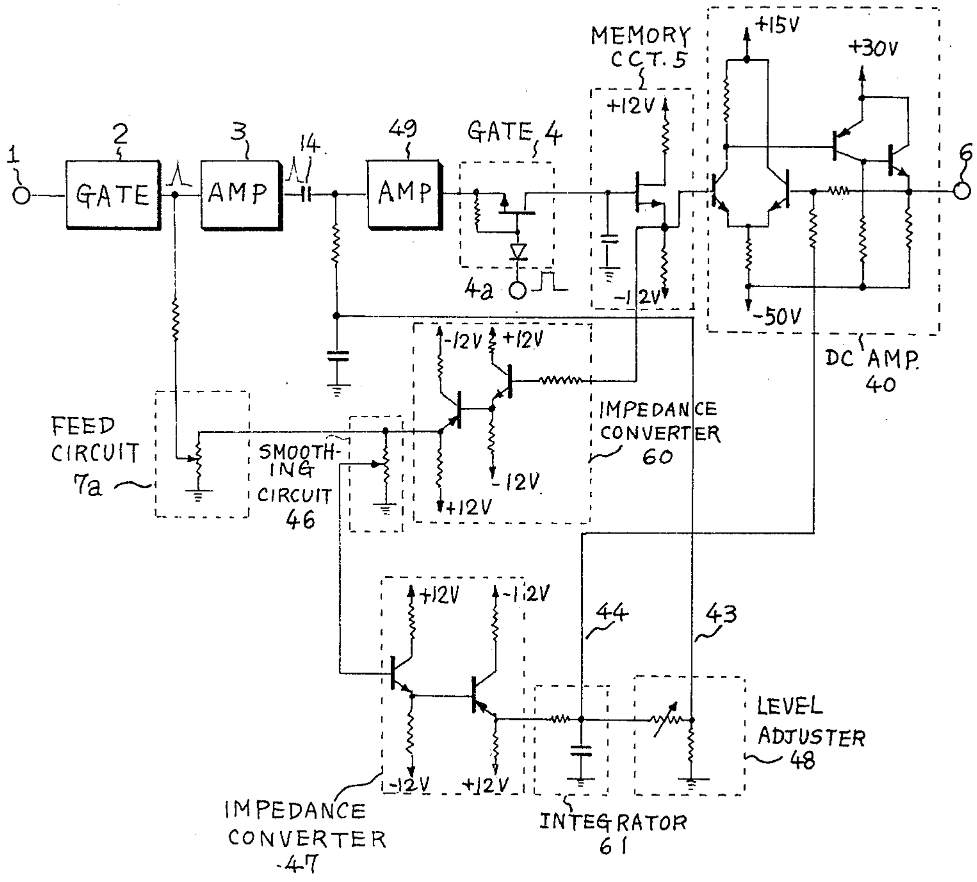
FIG. 6 is a circuit diagram illustrating another example of this invention.

FIG. 6 is a circuit diagram illustrating a concrete example of a combination shown in the circuits of FIGS. 3 and 4. In this example, a reference numeral 46 indicates a smoothing circuit, and 60 an impedance converter which receives the output of the memory circuit 5 at a higher input impedance to convert it into a low output impedance. This impedance converter 60 is a circuit in which the feed circuit 7 and the amplifier 45 are combined with each other and in which a PNP-type transistor and a NPN-type transistor are combined with each other in the emitter follower configuration to form a constant-voltage source (low impedance) circuit for temperature compensation. A reference numeral 47 designates an impedance converter which also converts an input thereto into a constant output impedance as is the case of the circuit 60, and 61 an integrator for an instant feed voltage by an appropriate delay time so as to feed the preceding memory level at the next sampling operation. A reference numeral 49 identifies an amplifier interposed between the gate circuit 4 and the coupling capacitor 14. The circuits 60, 46, 47, 61 and 48 form the feed circuit 41 (FIG. 3). Even if any other feed circuit is provided for improving the dot response, or even if no feed is effected, it is possible to adjust fluctuation in the amplitude or in the DC component to zero. As has been described in the foregoing circuits according to this invention, adjustment is simple, the operation is stable, and a desired amount of noise can be reduced under any conditions, and further, fluctuation in the output amplitude and in the DC component can be reduced to zero.

What I claim is:

1. A sampling circuit for a sampling oscilloscope comprising:

a. a sampling gate circuit provided with input means for receiving an input signal to be sampled;

b. a sampling pulse generator connected to said sampling gate circuit for applying narrow sampling pulses thereto whereupon said sampling gate circuit gates the input signal to provide input signal samples as an output signal thereof;

c. an amplifier receptive of the input signal samples from said sampling gate circuit;

d. another gate circuit AC-coupled with an output of said amplifier for receiving the input signal samples;

e. a gate pulse generator receptive of sampling pulses developed by said sampling pulses generator for developing gate pulses in synchronism with the sampling pulses and applying said gate pulses to said another gate circuit for enabling said another gate circuit;

f. a memory circuit receptive of an input signal sample from said another gate circuit when said other gate circuit is enabled for storing the input signal sample until a subsequent input signal sample is applied thereto;

g. An output amplifier receptive of an input signal sample from said memory circuit and having output means for providing an output signal thereat;

h. feed circuit means receptive of the input signal sample from said memory circuit for developing a first signal proportional to the input signal sample and for developing a second signal proportional to the input signal sample where the first signal and the second signal are of the same proportion of the input signal sample;

i. means for applying the first signal to said another gate circuit when a subsequent input signal sample is applied to said memory circuit; and j. means for subtracting the second signal from an input signal sample applied to said output amplifier.

2. In a sampling circuit for a sampling oscilloscope according to claim 1, in which said feed circuit means comprises an integrator circuit.

3. In a sampling circuit for a sampling oscilloscope according to claim 1, in which said feed circuit means comprises an impedance converter circuit.

4. In a sampling circuit for a sampling oscilloscope according to claim 1 wherein said output amplifier is a differential amplifier and said means for subtracting the second signal from an input signal sample applied to said output amplifier comprises means applying the second signal to an inverting input terminal of the differential output amplifier.

5. In a sampling circuit for a sampling oscilloscope according to claim 1 wherein said feed circuit means includes a high input impedance amplifier for applying the first signal to said other gate circuit.

6. In a sampling circuit for a sampling oscilloscope according to claim 1 wherein said feed circuit means comprises means for varying the proportion of the input signal sample that are the first signal and the second signal.

* * * * *